(12) United States Patent
Trampitsch

(10) Patent No.: US 9,116,048 B2
(45) Date of Patent: Aug. 25, 2015

(54) CIRCUITS FOR AND METHODS OF ACCURATELY MEASURING TEMPERATURE OF SEMICONDUCTOR JUNCTIONS

(75) Inventor: Gerd Trampitsch, Unterfoehring (DE)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 3 days.

(21) Appl. No.: 13/024,591

(22) Filed: Feb. 10, 2011

(65) Prior Publication Data

US 2012/0207190 A1 Aug. 16, 2012

(51) Int. Cl.
*G01K 7/00* (2006.01)
*G01K 7/01* (2006.01)

(52) U.S. Cl.
CPC . *G01K 7/01* (2013.01); *G01K 7/015* (2013.01)

(58) Field of Classification Search
CPC ........................................................ G01K 7/01
USPC ................... 374/178, 170, 171, 172, E7.025, 374/E7.018, E7.032; 257/467; 327/512
See application file for complete search history.

(56) References Cited

U.S. PATENT DOCUMENTS

| | | | | |
|---|---|---|---|---|
| 5,325,045 | A * | 6/1994 | Sundby | 323/313 |
| 5,841,310 | A * | 11/1998 | Kalthoff et al. | 327/337 |
| 5,982,221 | A * | 11/1999 | Tuthill | 327/512 |
| 6,008,685 | A * | 12/1999 | Kunst | 327/512 |
| 6,097,239 | A * | 8/2000 | Miranda et al. | 327/512 |
| 6,242,974 | B1 * | 6/2001 | Kunst | 330/9 |
| 6,554,469 | B1 * | 4/2003 | Thomson et al. | 374/178 |
| 6,590,517 | B1 * | 7/2003 | Swanson | 341/155 |
| 6,683,444 | B2 * | 1/2004 | Marie | 323/314 |
| 6,847,319 | B1 * | 1/2005 | Stockstad | 341/119 |
| 6,853,237 | B2 * | 2/2005 | Murakami et al. | 327/512 |
| 7,010,440 | B1 * | 3/2006 | Lillis et al. | 374/178 |
| 7,083,328 | B2 | 8/2006 | Johnson | |
| 7,138,848 | B2 * | 11/2006 | Wu et al. | 327/337 |
| 7,180,358 | B2 * | 2/2007 | Kwon et al. | 327/346 |
| 7,253,597 | B2 * | 8/2007 | Brokaw | 323/314 |
| 7,281,846 | B2 * | 10/2007 | McLeod | 374/178 |
| 7,429,129 | B2 * | 9/2008 | St. Pierre et al. | 374/178 |
| 7,514,998 | B2 * | 4/2009 | Mojarradi et al. | 330/256 |
| 7,637,658 | B2 * | 12/2009 | Gardner et al. | 374/178 |
| 7,948,298 | B2 * | 5/2011 | Kameyama et al. | 327/513 |

(Continued)

OTHER PUBLICATIONS

Kuijk K, "A Presion Reference Voltage Source", IEEE Journal of Solid-State Circuits, vol. SC-8, No. 3, Jun. 1973.*
Kennedy G., Rinne K., "A Programmable Bandgap Voltage Reference CMOS ASIC for Switching Power Converter Integrated Digital Controllers", Instrument and Measurement Technology ConferenceMay 2005.*
European Search Report issued in Application No. 1200090.9 issued on Jun. 5, 2012.

*Primary Examiner* — Lisa Caputo
*Assistant Examiner* — Nasir U Ahmed
(74) *Attorney, Agent, or Firm* — McDermott Will & Emery LLP

(57) ABSTRACT

A system for and method of providing a signal proportional to the absolute temperature of a semiconductor junction is provided. The system comprises: a preprocessing stage configured and arranged so as to process a signal from the semiconductor junction so as to produce a preprocessed signal including a resistance error term; and a temperature to voltage converter stage for converting the preprocessed signal to a voltage proportional to absolute temperature representing the absolute temperature of the semiconductor junction; wherein the system is configured and arranged so as to remove the resistance error term so as to produce a resistance error free signal representative of the semiconductor junction temperature.

30 Claims, 10 Drawing Sheets

(56) References Cited

U.S. PATENT DOCUMENTS

2006/0029123 A1* 2/2006 Johnson ........................ 374/178
2007/0091979 A1* 4/2007 Chiu ................................ 374/1
2008/0095213 A1* 4/2008 Lin et al. ....................... 374/170
2008/0259999 A1 10/2008 Gardner et al.
2010/0040111 A1 2/2010 Cheng et al.

* cited by examiner

CIRCUITS FOR AND METHODS OF ACCURATELY MEASURING TEMPERATURE OF SEMICONDUCTOR JUNCTIONS

RELATED APPLICATIONS

NONE

TECHNICAL FIELD

The present application relates to circuits for and methods of accurately measuring the temperature of semiconductor junctions free of resistance error terms.

BACKGROUND

In various contexts, the temperature of a circuit, such as one formed on an integrated chip needs to be monitored and controlled in order to insure that the chip properly functions and is protected from overheating. Such an application arises, for example, where a personal computer (PC) processor chip needs to be monitored and controlled. When the temperature of the computer chip exceeds a certain threshold level, a cooling fan is turned on so as to provide the circulating air to cool the chip. One technique that has been developed utilizes a semiconductor pn junction formed on the chip. Excitation currents applied through the pn junction generate temperature related signals that can be used to determine the temperature of the chip.

Some ICs are sensed externally or remotely, and thus have external terminals for coupling an internal temperature sensor, comprising a pn junction, to a remote temperature sensing circuit. Other ICs are sensed internally, and thus have an on-chip temperature sensing circuit coupled directly to the IC's temperature sensor pn junction.

There are a number of ways to determine the temperature of a pn semiconductor junction, whether the pn semiconductor junction is sensed internally or externally. One known method involves sequentially applying two different DC currents to the pn junction, and measuring the voltage across the pn junction, for the respective currents. The difference between the voltage values is a function of the temperature of the sensed pn junction, and thus represents that temperature measurement.

This known two current sequence method described above may provide inaccurate results, because it fails to adequately compensate for a parasitic resistance that develops across the sensed pn junction. Such a parasitic resistance may include the internal resistance of the sensed diode device as well as resistance associated with paths connecting the sensing circuit to the sensed pn junction.

It should be noted that the pn junction can be formed in any one of a number of ways Accordingly as used herein, it should be understood that the term "diode" as described and illustrated in connection with detailed description of the drawings and as may be used in the claims to designate a pn junction, is not necessarily limited to a diode arrangement, but includes any pn junction such as a pn junction of a bipolar transistor.

Reference is made to U.S. Pat. No. 7,010,440 (Lillis et al.) and U.S. Pat. No. 7,083,328 (Johnson).

SUMMARY

In accordance with one aspect of the described system and method, a system for providing a signal proportional to the absolute temperature of a semiconductor junction is provided. The system comprises: a preprocessing stage configured and arranged so as to process a signal from the semiconductor junction so as to produce a preprocessed signal including a resistance error term; and a temperature to voltage converter stage for converting the preprocessed signal to a voltage proportional to absolute temperature representing the absolute temperature of the semiconductor junction; wherein the system is configured and arranged so as to remove the resistance error term so as to produce a resistance error free signal representative of the semiconductor junction temperature.

In accordance with another aspect of the described system and method, a method of providing a signal proportional to the absolute temperature of a semiconductor junction, comprises: preprocessing a signal from the semiconductor junction so as to produce a preprocessed signal including a resistance error term; and converting the preprocessed signal to a voltage proportional to absolute temperature representing the absolute temperature of the semiconductor junction; wherein the voltage proportional to absolute temperature is free of the resistance error term so as to produce a resistance error free signal representative of the semiconductor junction temperature.

GENERAL DESCRIPTION OF THE DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same or like numeral appears in different drawing figures, it refers to the same or like components or steps, and includes all alternative arrangements.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

DETAILED DESCRIPTION OF THE DRAWINGS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Accordingly, embodiments of the present disclosure can provide for improved performance of measuring the temperature of an IC chip. Once the resistance error term is removed so as to produce a resistance error free signal representative of the semiconductor junction temperature, the system instantly delivers accurate results without waiting for cancellation during an integration cycle. Further, the system is designed to provide relatively accurate temperature sensing all in the analog domain, providing a less expensive and simpler design. If the temperature to voltage converter stage for converting the preprocessed signal to a voltage proportional to absolute temperature ($V_{PTAT}$) includes an analog-to-digital converter so to generate the $V_{PTAT}$ as a digital signal, there is no need for error correcting calculations in the digital domain.

Figure 1:
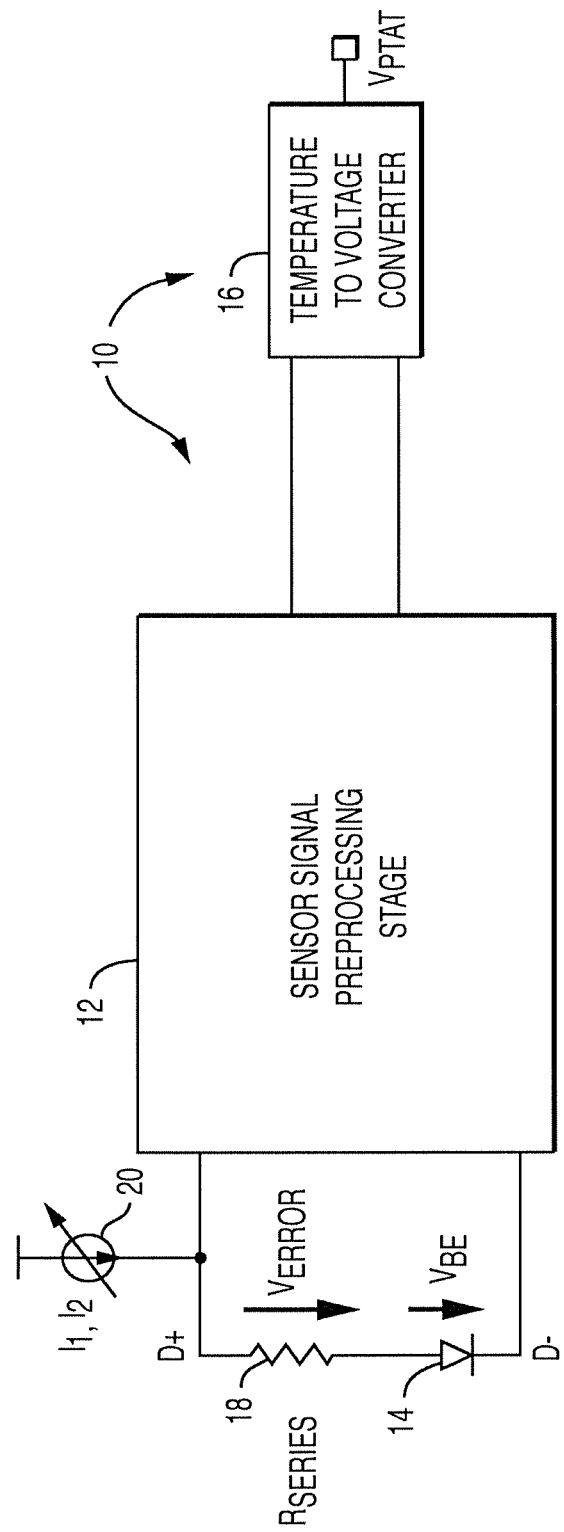
FIG. 1 is a block diagram of one embodiment of a two stage system for generating an output voltage that is proportional to the absolute temperature of a pn junction.

Referring to FIG. 1, the block diagram illustrates one embodiment of the system for providing a $V_{PTAT}$ free of the resistance error term. The system 10 includes at least two stages, a sensor signal preprocessing stage 12 configured and arranged so as to preprocess signals from the semiconductor junction indicated at 14, and a temperature to voltage converter stage 16 configured and arranged so as to convert the preprocessed signal to a $V_{PTAT}$ representing the absolute temperature of the semiconductor junction 14. As shown the system is configured and arranged so as to remove the resistance error term attributed by the resistance (Rseries) 18 so as to produce a resistance error free signal representative of the absolute temperature of the semiconductor. The resistance Rseries 18 can be a separate resistance element(s), or inherent resistance along the signal path of the semiconductor junction 14. Thus, when it is desirable to provide an output signal $V_{PTAT}$, two reference currents $I_1$ and $I_2$ of different values (provided at 20) are sequentially applied through the semiconductor 14, which generates a voltage equal to $V_{BE}$ plus the error signal Verror attributed to the resistance Rseries 18. The combined voltage $V_{BE}$ and Verror is sensed by the preprocessing stage 12. In accordance with the embodiment shown in FIG. 1, the preprocessing stage is configured to remove the errors due to the resistance Rseries prior to applying the signal to voltage converter stage 16.

The error signals are eliminated based upon the following relationship:

$$V_1 = \eta \cdot \frac{kT}{q} \cdot \ln\left(\frac{I_1}{I_S}\right) + R_S \cdot I_1 = V_{BE} + V_{ERROR} \quad (1)$$

wherein:
Rs is the resistance Rseries;
k is the Boltzman constant;
T is the absolute temperature
Q is the electron charge in the semiconductor junction;
η is the ideality factor of the semiconductor junction;
Ii is the reference current applied to the semiconductor junction:
Is is the reverse saturation current; and
Vi is the composite voltage with the application of the current Ii.

With knowledge of this relationship, as will be evident herein after the system 10 can be designed so as that the combined signal $V_{BE}$+Verror can be modified so that the error term Verror can be removed leaving the signal $V_{BE}$ to be converted to the $V_{PTAT}$ signal.

The preprocessing stage can be implemented in accordance with at least two configurations, one including a variable offset buffer, the other including a variable gain amplifier.

Figure 2:
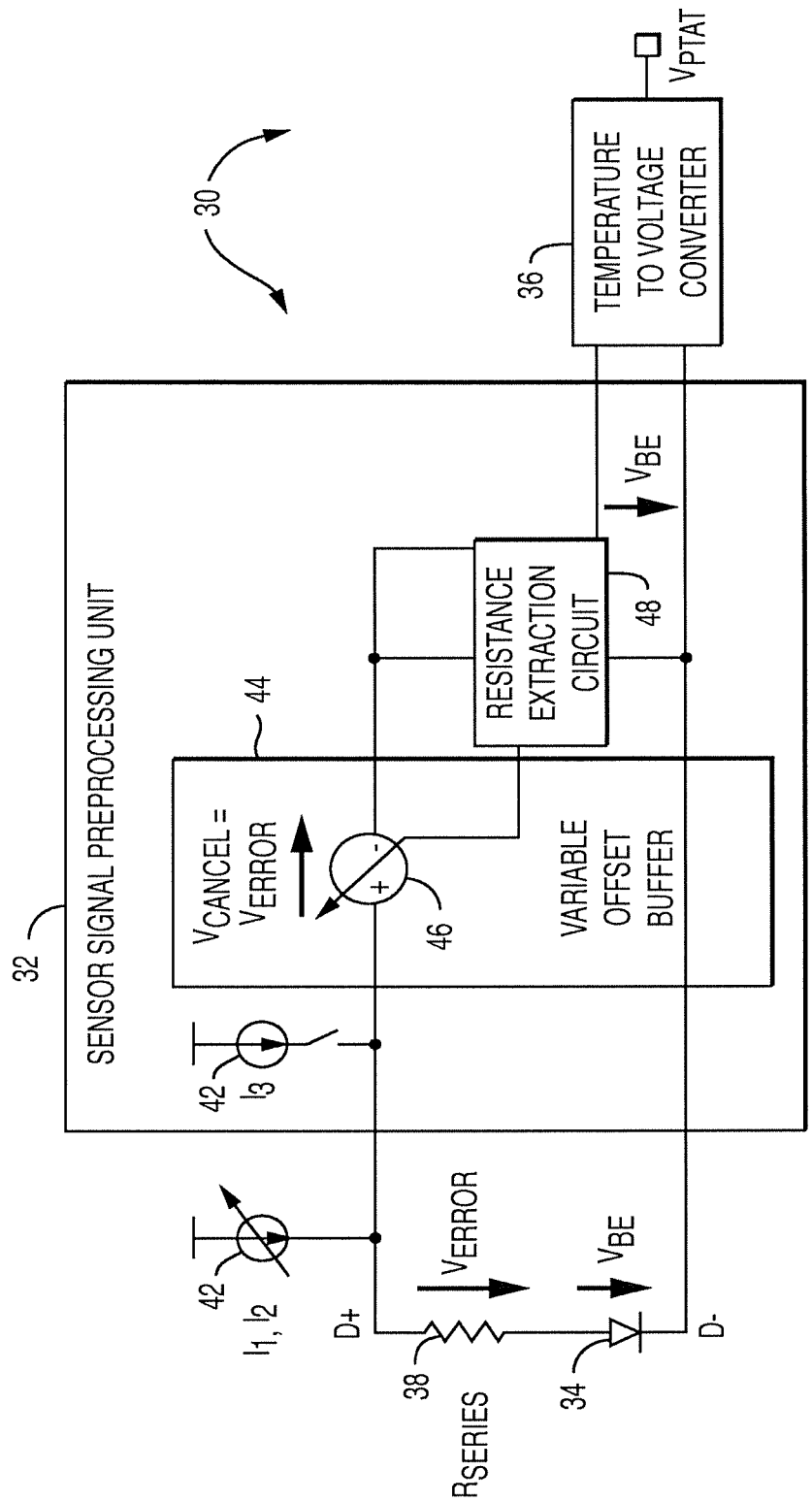
FIG. 2 is a block diagram of an example of a more detailed implementation of the embodiment shown in FIG. 1 incorporating a variable offset buffer.

FIG. 2 illustrates one embodiment of the variable offset buffer approach. This approach includes the application of at least three reference currents through the semiconductor junction, and is based on the following relationship derived from equation (1):

$$V_3 + V_1 - 2V_2 = \frac{\eta kT}{q}\left[\ln\left(\frac{I_3}{I_2}\right) - \ln\left(\frac{I_2}{I_1}\right)\right] + Rs \cdot (I_3 - 2I_2 + I_1) \quad (2)$$

By making the ratio of current $I_3/I_2=I_2/I_1$, it should be evident that the first term of equation (2) cancels, leaving the resistance error term $Rs \cdot (I_3-2I_2+I_1)$ so that $$Rs \cdot (I_3-2I_2+I_1)=V_3+V_1-2V_2 \quad (3)$$

One example of the current values of $I_1$, $I_2$ and $I_3$ are respectively 10 µamps, 40 µamps and 160 µamps, although the values can clearly vary depending on the application so long as $I_3/I_2=I_2/I_1$.

Thus, the approach provided by the FIG. 2 embodiment is to provide the currents $I_1$, $I_2$ and $I_3$ in the required ratios, and generate the voltage $V_3$ (provided across the resistance Rseries and the semiconductor junction in response to the current $I_3$), add the voltage $V_1$ (provided across the resistance Rseries and the semiconductor junction in response to the current $I_1$), while subtracting two times the voltage $V_2$ (provided across the resistance Rseries and the semiconductor junction in response to the current $I_2$). As will become evident hereinafter these arithmetic computations can be carried out in the analog domain using one or more storage capacitors to integrate the voltages.

Referring again to FIG. 2, the additional current source $I_3$ is provided at 42. Variable offset buffer 44 is configured and arranged so that the resistance error term is determined at 48 and removed by changing a variable offset 46 of the input buffer 44. Once the correct value of the resistance error term is determined, Vcancel equals Verror. In this way the input signal to the temperature to voltage converter 36 is free from errors due resistance error and the sensor temperature can be determined using currents $I_1$ and $I_2$. The operation of the system is controlled with a controller 50.

Figure 3:
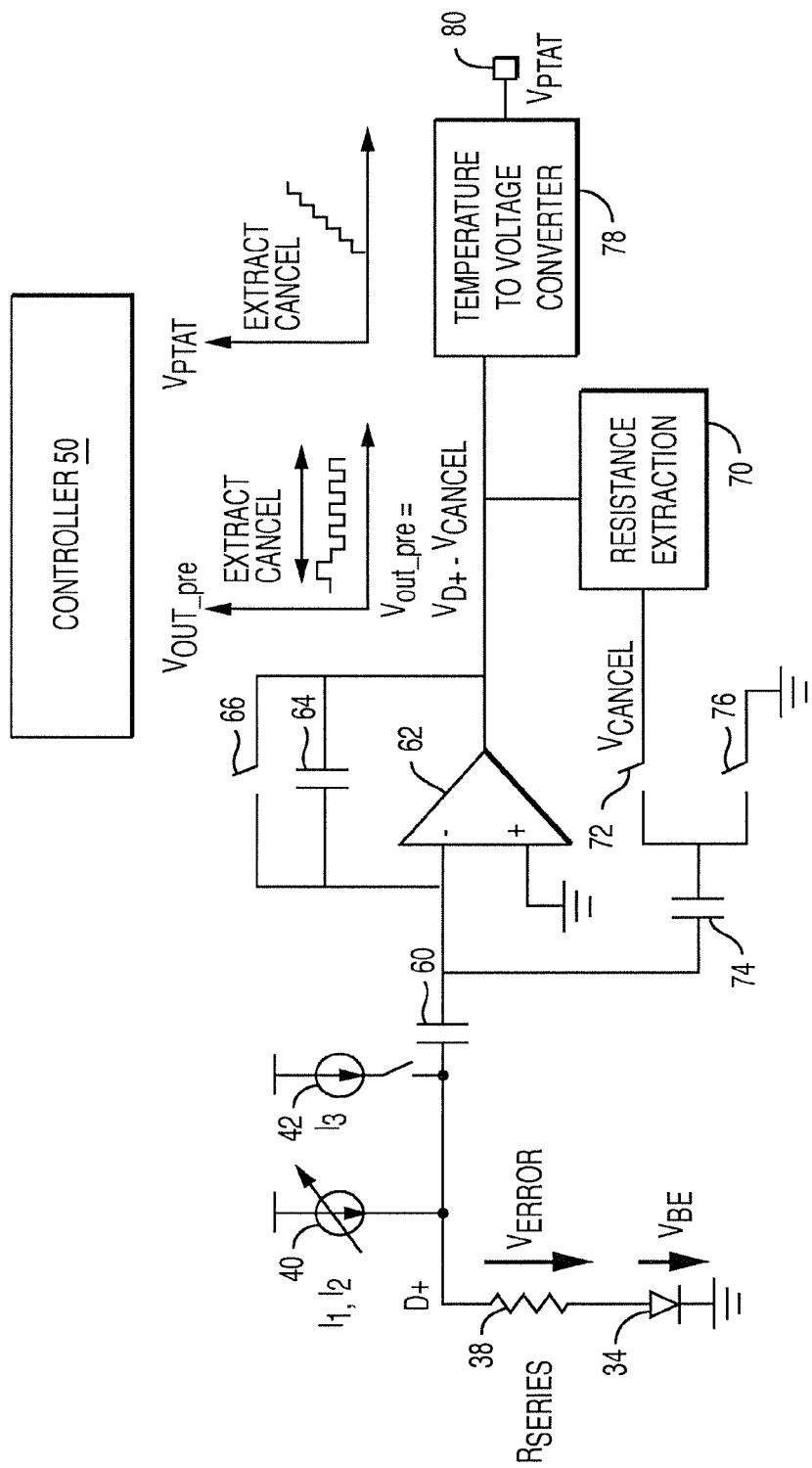
FIG. 3 is a partial block and partial schematic diagram showing details of the variable offset buffer of the exemplary embodiment shown in FIG. 2.

One possible implementation of the variable offset buffer is shown in greater detail in FIG. 3. As shown, each signal provided by the $V_{BE}$+Verror signal in response to the application of the $I_1$, $I_2$, and $I_3$ currents is applied through the input capacitor 60 to the inverting input of the integrator, formed by the operational amplifier 62 and feed back capacitor 64, the latter being connected between the output and inverting input of the operational amplifier 62. A switch 66 is provided in a second feedback loop between the output and inverting input of the operational amplifier 62. A third feedback path is provided between the output and inverting input of operational amplifier 62. Specifically, the output of the amplifier 62 is connected to the input of the resistance extraction circuit 70. The output of the circuit 70 is connected to switch 72, which in turn is connected to the inverting input through the capacitor 74. A second switch 76 connects the capacitor 74 to system ground. As will be more evident hereinafter the capacitor 74 functions to store a signal equal to Vcancel so that it can be subtracted from the input signal $V_{BE}$+Verror, and switch 76 is used to clear the storage capacitor 74, and switch 66 is used to reset the integrator formed by operational amplifier 62 and capacitor 64 after each cycle of measurement. The output of amplifier 62 indicated as Vout_pre is thus $V_{D+}$ (which is the $V_{BE}$+Verror)−Vcancel (Vcancel=Verror)) applied to the converter 78. The output of the latter is thus $V_{PTAT}$ as shown at 80.

In operation, as shown in the two timing diagrams shown in FIG. 3, the components shown operate in at least two phases over a cycle, an extraction phase (wherein the circuit determines the error term, Vcancel), and a cancellation phase (wherein the error term is eliminated). During the extraction phase the output of-operational amplifier 62 is applied to the resistance extraction circuit 70. The latter is configured to accumulate the integrated signal during the extraction phase. The stored signal is applied to the input of the operational amplifier 62 during the cancellation phase so that during this phase the output Vout_pre of the amplifier is equal to $V_{D+}$−Vcancel, because the error signal is subtracted at the inverting input of the amplifier 62. The preprocessed signal is applied to the converter 78, which provides the output $V_{PTAT}$ at the end of the cancellation phase. Once the cancellation phase is completed the switch 72 is opened, and switches 66 and 76 are closed to clear the capacitors 64 and 74 during a reset phase.

Figure 4:
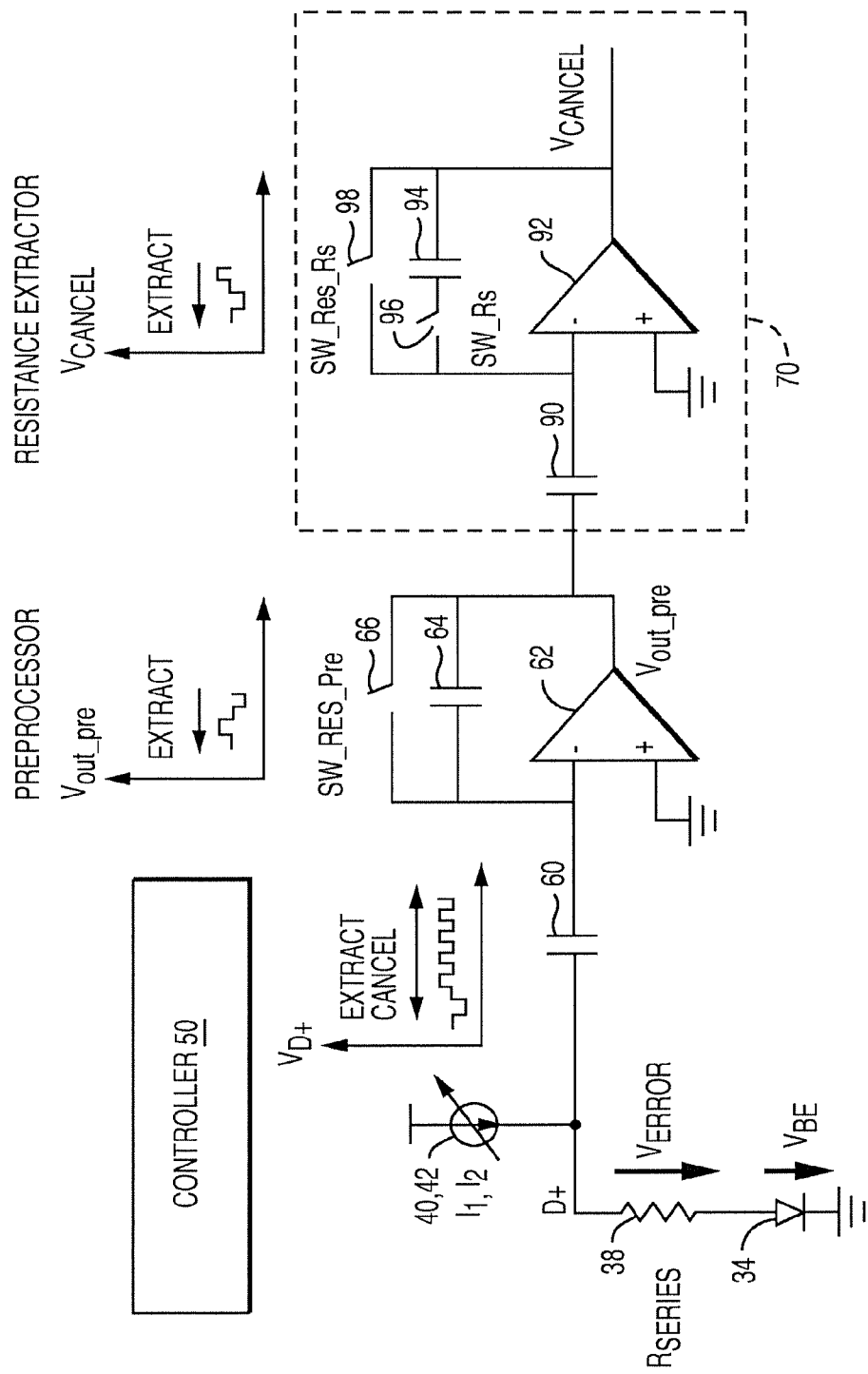
FIG. 4 is a block diagram of the components used of the FIG. 2 exemplary embodiment during the extraction phase of operation.

FIG. 4 illustrates one embodiment of the components used during the extraction phase. The components shown are divided into the preprocessing stage and the resistance extractor stage. The resistance extractor stage includes the input capacitor 90 coupling the output of the operational 62 of the preprocessor stage to the inverter input of an integrator formed by an inverting operational amplifier 92 and a feedback capacitor 94 coupled between the output and inverting input of the amplifier 92. A second feedback path includes switch 98 connected between the output and inverting input of the inverting amplifier 92, in parallel with the capacitor 94. Switch 98 is used to reset capacitor 94 when the switch is closed. The output of the resistance extractor is Vcancel. Vcancel is given by the following equation (4).

$$V_{c2}=V_{c1}+V_{23}+V_{21} \tag{4}$$

the terms being defined below.

Figure 5:
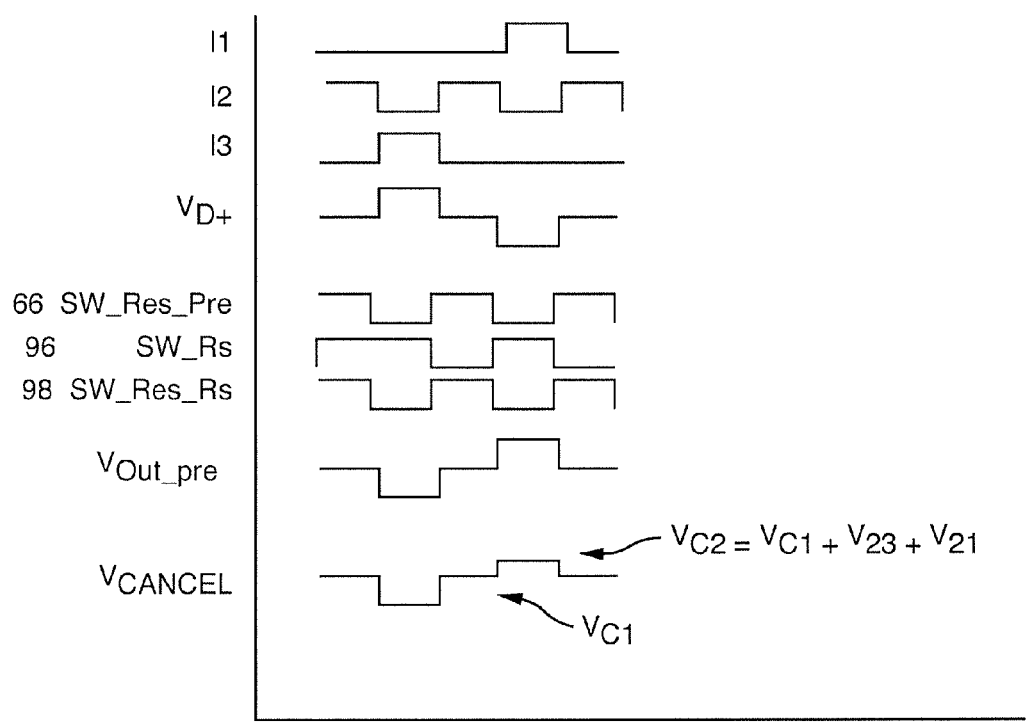
FIG. 5 is an example of a timing diagram representing the operation of the FIG. 4 exemplary embodiment during the extraction phase of operations.

As shown by the timing diagram of FIG. 5, the currents $I_1$, $I_2$ and $I_3$ are applied at separate times. As can be seen, the sensed voltage $V_{D+}$ varies depending on the magnitude of the reference current. In the example provided, reference current $I_3$ is the largest of the three reference currents so that $V_{D+}$ is at the largest voltage magnitude in response to $I_3$. Similarly, $V_{D+}$ is of an intermediate magnitude in response to intermediate level reference current $I_2$, and is the smallest in response to lowest level current reference current $I_1$. In operation it is necessary to accumulate and store these voltages in accordance with equation (4). The timing diagram appearing above the preprocessor stage of FIG. 4 shows how the signal Vout_pre signal is developed at the output to the preprocessor amplifier. It is clear that the waveform Vout_pre is an inverted version of $V_{D+}$ applied to the input of the amplifier 62 of the preprocessor because the amplifier 62 is inverting. The resistance extractor circuit 70 makes differential measurements, e.g., $V_{23}$ means the voltage $\Delta V_{BE}$ determined from $V_3-V_2$. This is accomplished by controlling the switches in the circuit. When it is sensing $V_2$, both switches 66 and 98 are closed so as to reset the capacitor, and switch 96 is opened. Under this condition there is no access to the integration capacitor 94. If the reset switch 98 is closed, the voltage at the output of the amplifier 92 connected directly to the inverting input of the amplifier 92 is close to ground.

In the next phase, switch 66 is opened and another current $I_1$ or $I_3$ is applied with the voltage accumulating on the feedback capacitor 64. The signal stored in capacitor 64 appears at the output Vout_pre of amplifier 62. With switch 96 closed and switch 98 open Vcancel develops on capacitor 94. The first voltage corresponds to V23, while the second voltage corresponds to $V_{21}$. The two voltages are added on the feedback capacitor 94, which equals the sum of the $\Delta V_{BE}$s. As will be seen in the example given in FIG. 3, $V_{C1}$ is actually ground, while $V_{C2}$ is the combination of the added voltages. $V_{C1}$ is usually the common mode voltage of the amplifier 92. $V_{C1}$ is provided when the switch 98 is closed and connects the output of the second stage amplifier to the inverting input.

Figure 6:
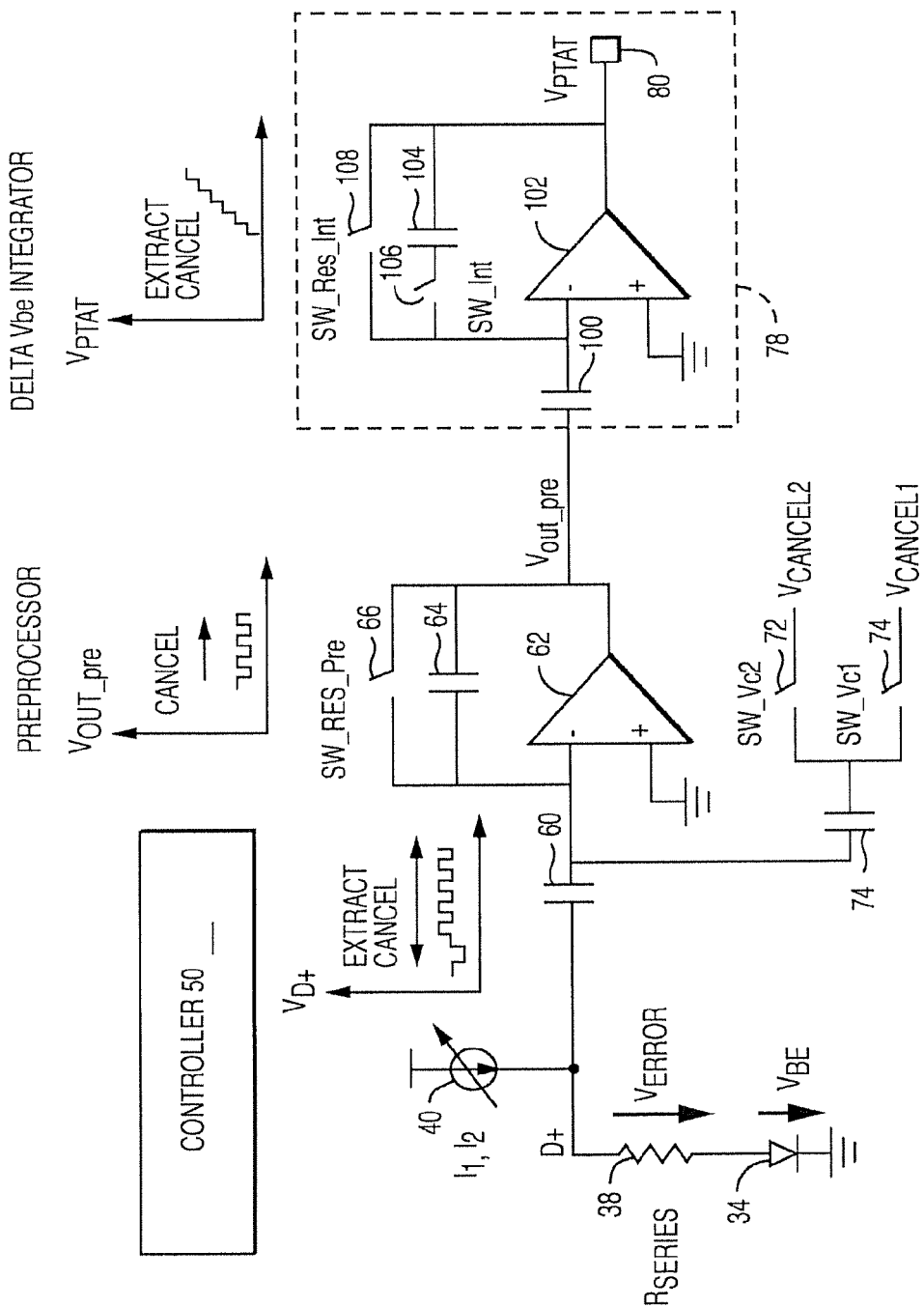
FIG. 6 is a block diagram of the components used of the FIG. 2 exemplary embodiment during the cancellation phase of operation.

The output of the resistance extractor amplifier 92 is Vcancel. Referring to FIG. 6, current $I_3$ is not required for the cancellation phase. It is only used in determining the resistance error term during the extraction phase. Using reference currents $I_1$ and $I_2$, two different $V_{BE}$ voltages are produced across the diode 34. At the beginning of this phase, the error correction signals Vcancel1 and Vcancel2 have now been determined and can be coupled to the input of the preprocessing stage to measure the sensor signal with variable offset. As a result the output Vout_pre of the amplifier 62 is now error free. As noted above, Vcancel1 is applied when the switches 66 and 98 are closed and the inputs to the inverting amplifiers are driven to system ground.

The output Vout_pre can be noisy. To cope with this, the temperature to voltage converter includes a delta $V_{BE}$ integrator, provided by amplifier 102 and capacitor 104, that is used to integrate the output voltage Vout_pre to improve the signal to noise ratio, S/N. The $V_{BE}$ integrator includes two switches 106 and 108 and a capacitor 104 in the two feedback paths of the operational amplifier 102. The result is a voltage output that is $V_{PTAT}$.

The delta $V_{BE}$ integrator converter of FIG. 6 is an embodiment of the temperature to voltage converter 78 shown in FIG. 4. The converter of FIG. 6 includes a coupling capacitor 100 for coupling the output of the operational amplifier Vout_pre to an inverting input of an integrator 102 formed by operational amplifier 102, and feedback capacitor 104. A switch 106 is provided for coupling the capacitor 104 between the output and inverting input of the operational amplifier 102 when the switch is closed. A second switch 108 provides a second feedback path between the output and inverting input of the operational amplifier 102 when that switch is closed. The switches 72 and 74 provide the Vcancel2 and Vcancel1 signals based upon the closing of the respective switches 72 and 74. Note that in the embodiment shown in FIG. 6, Vcancel2 is provided by the output of the resistance extraction circuit 70 (shown in FIGS. 3 and 4), while Vcancel1 is provided by system ground.

Describing the cancellation phase in more detail, the output of the extraction circuit 70 represents the voltage across the resistance Rseries, and is indicated by Vcancel. Vcancel is given by the equation $$V_{C2}=V_{C1}+V_{23}-V_{21}. \tag{4}$$

As shown in the timing diagram, $I_1$, $I_2$ and $I_3$ are applied at separate times as shown. Referring to $V_{D+}$, the voltage varies with each excitation current. Since $I_3$ is the largest current, $V_{D+}$ is at the highest level. $I_2$ is the second largest current, so $V_{D+}$ is at an intermediate level, while $I_1$ is the smallest current, so $V_{D+}$ is at its lowest level. In operation, it is necessary to record these voltages. This is done in the preprocessor capacitor 64 of the feedback path of the inverting amplifier 62 shown in FIG. 4. The timing diagram shown in FIG. 5, illustrates how the Vout_pre signal is developed at the output of the preprocessor amplifier 62. It is noted that the waveform Vout_pre is the inverted version of the $V_{D+}$ applied to the input of the amplifier of the preprocessor because the amplifier is inverting.

The resistance extractor circuit 70 makes differential measurements (V23 for example, means the $\Delta V_{BE}$ determined from the difference $V_3-V_2$, where $V_3$ is the voltage in response to the excitation current $I_3$, and $V_2$ is the voltage in response to the excitation current $I_2$). This is accomplished by controlling the switches 66, 96 and 98. When circuit 70 is sensing $V_2$, both switches 96 and 98 are closed so as to reset the capacitor 94.

When switch 96 is opened, there is no access to the integration capacitor 94. If the switch 98 is closed, the voltage at the output of the amplifier 92 is connected directly to its inverting input and is close to ground. This is the desired condition prior to measuring $V_2$. If the output Vout_pre of the preprocessor amplifier is $V_2$, then the coupling capacitor 90 between the two stages will charge to $V_2$. In the next step, another current is applied. The output Vout_pre steps to the next round. The signal is stored on the integrator's capacitor.

It should be noted that during operation during the extraction phase with switch 66 initially closed, the voltage of Vcancel at the output of the resistance extractor 70 equal to $V_{C1}$. When switch 66 is then opened, the currents change resulting in the resistance extractor output voltage Vcancel changing. As the voltages accumulate on the feedback capacitor 94, as shown in the timing of FIG. 5 is the first accumulated voltage corresponds to $V_{23}$, while the second accumulated voltage corresponds to $V_{21}$. The voltages are added on the feedback capacitor, which equals the sum of the $\Delta V_{BE}$s. As noted $V_{C1}$ is actually ground, while $V_{C2}$ is the combination of added voltages. $V_{C1}$ is usually the common mode voltage of the amplifier 92. $V_{C1}$ is provided when the switch 98 is closed and connects the output of the second stage amplifier 92 of the resistance extractor circuit 70 to its inverting input.

Figure 7:
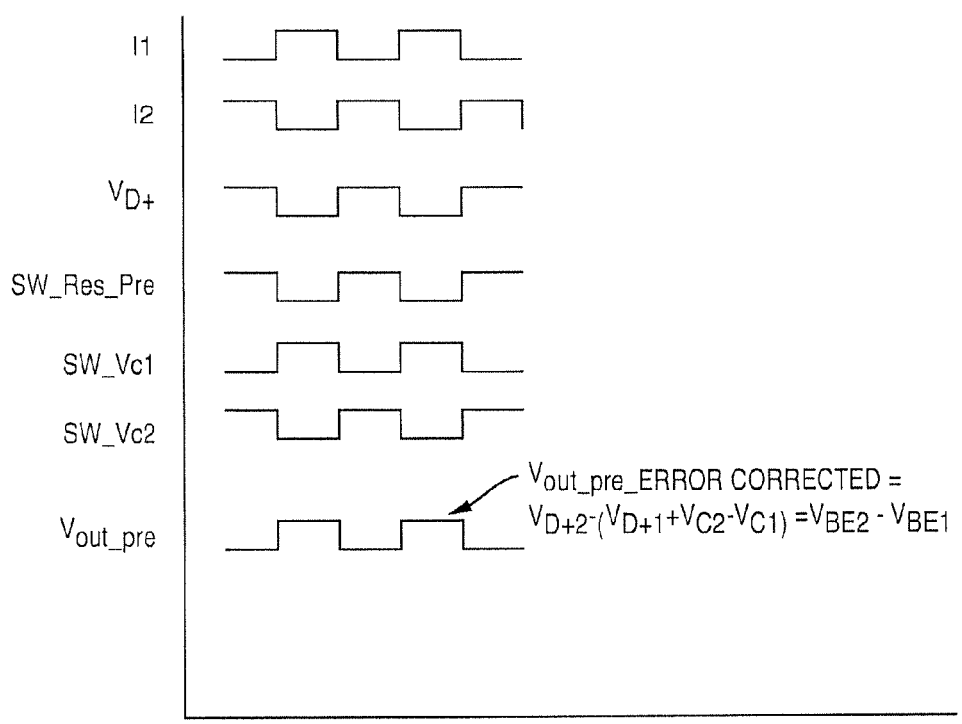
FIG. 7 is an example of a timing diagram representing the operation of the FIG. 6 exemplary embodiment during the cancellation phase of operations.

As seen in FIG. 4, the output of the resistance extractor amplifier 92 is Vcancel. As shown by the timing diagram of FIG. 7, applying the currents $I_1$ and $I_2$ in the circuit of FIG. 6, and operating the switches 66, 72, 74, 106 and 108 in accordance with the sequence shown, results in the generation of $V_{BE}$ on the feedback capacitor 104 of the delta $V_{BE}$ integrator circuit 78 so that the output of amplifier 102 is $V_{PTAT}$. During operation, switch 106 is closed and switch 108 is opened when the converter 78 is integrating the signal during the cancellation phase. Both switches 106 and 108 are closed when it is necessary to clear the capacitor 104 and reset the integrator. As indicated in the timing diagram, the corrected output voltage Vout_pre of the preprocessor stage (with Vcancel being used to cancel the error term Verror), is determined by the following:

$$V_{D+2}-(V_{D+1}+V_{C2}-V_{C1})=V_{BE2}-V_{BE1}$$

wherein $V_{D+1}$ and $V_{D+2}$ are the voltage measurements during any two successive sampling intervals, $V_{C1}$ and $V_{C2}$ are the voltages Vcancel1 and Vcancel2 applied through switches 72 and 76, respectively, and $V_{BE2}-V_{BE1}$ is the incremental change in the measurement of $V_{BE}$ during each measurement interval. The integration capacitor 104 thus provides a simple component for accumulating several error compensated $V_{BE2}-V_{BE1}$ measurements.

Figure 8:
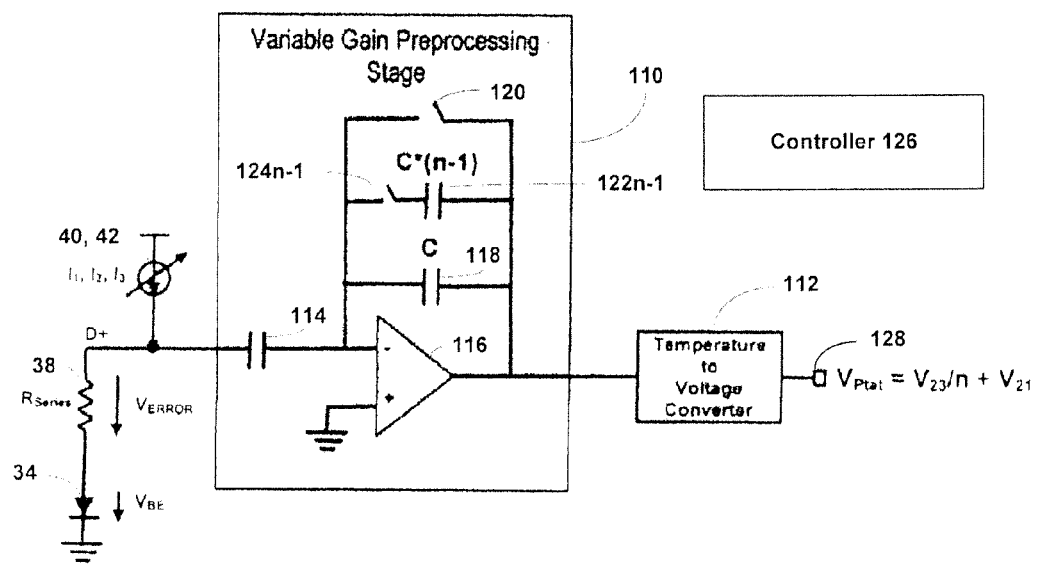
FIG. 8 is a partial block and partial schematic diagram showing details of a second embodiment shown in FIG. 1 and including a preprocessor stage comprising a variable gain buffer stage.

In accordance with another embodiment shown in FIG. 8, the voltage $V_{PTAT}$ is provided free of the resistance error term using a variable gain preprocessing stage 110 connected to temperature to voltage converter 112. In the illustrated embodiment, the stage 110 includes input coupling capacitor 114 coupling the diode 34, resistance 38 and current sources 40, 42 to the inverting input of operational amplifier 116 of the stage 110. As illustrated amplifier 116 has its non-inverting input connected to system ground, while its output is connected to its inverted input through three or more feedback paths. One feedback path is the through the feedback capacitor 118. A second feedback path is provided through switch 120. One or more additional feedback paths are each provided with a capacitor $122_{n-1}$ in series with a switch $124n-1$, the latter for connecting and disconnecting the corresponding capacitor in a separate feedback loop, parallel to the loop formed by capacitor 118. The circuit is controlled by controller 126. The circuit operates to provide $V_{PTAT}$ at the output 128 of converter 112 free of the resistance error attributed by Rseries.

The FIG. 8 operates based on the following relationships: For $I_2/I_1=I_3/I_2=n$, where n is the total number of possible capacitor feedback paths of the amplifier 116:

$$V_{21} = \frac{\eta kT}{q}\ln(n) + Rs \cdot (n-1) \cdot I_1 \quad (5)$$

$$V_{23} = -V_{32} = -\frac{\eta kT}{q}\ln(n) - Rs \cdot (n^2-n) \cdot I_1 \quad (6)$$

$$V_{23\_scaled} = \frac{V_{23}}{n} \quad (7)$$

$$V_{out} = \frac{V_{23}}{n} + V_{21} = \frac{n-1}{n} \cdot \frac{\eta kT}{q}\ln(n) \quad (8)$$

Wherein $V_{OUT}$ in equation (8) is $V_{PTAT}$ provided at the output 128 of converter 112.

The addition of $V_{21}$ and $V_{23\_scaled}$ can take place in the variable gain preprocessing stage or the temperature to voltage converter. The gain of the preprocessor can be programmed by controller 126 for each step of the process.

In the FIG. 8 embodiment, the resistive error term is scaled by changing the gain of the preprocessing stage as a function of the current cycle. By changing the gain it is possible to make the error terms for measurements $V_{21}$ and $V_{23}$ equal, enabling easy cancellation of the resistive error term. More specifically, all three reference currents $I_1$, $I_2$ and $I_3$ are used by the circuit. For one excitation current, switch 120 is closed so that the gain is determined by the feedback path without a capacitor. For a second current, the both switches 120 and 124 are open so that the bottom capacitor 118 determines the feedback path. For the third current, the switch 124 is closed (while switch 120 remains open) so that the two capacitors 118 and 122 in the two feedback paths determine the gain.

As mentioned above, the output $V_{PTAT}=V_{23}/n+V_{21}$. This assumes that $I_3$ is the largest current, $I_2$ is the intermediate current and $I_1$ is the smallest current. Thus, the resistance artifact in the differential voltage $V_{23}$ is larger than the resistance artifact in the differential voltage $V_{21}$. Accordingly, the $V_{23}$ is divided by n so that the term is on the same scale as that provided by $V_{21}$. The result is that the output is free from the resistive error term. Note that $n=I_2/I_1=I_3/I_2$.

More specifically, looking at the equations (5)-(8): the term $V_{21}$ is $V_2-V_1$. Similarly, $V_{23}$ is $V_2-V_3$ and is equal to $-V_{32}$. The left term in each equation is the temperature information and is the term of interest. The right term of each equation is the resistance error term. Scaling $V_{23}$ by dividing by n ($V_{23\_scaled}$), it can be seen that the error term is the same as the error term of $V_{21}$ (Rs·($n^2-n$)·$I_1$)/n=Rs·(n-1)·$I_1$. And by adding the two values of $V_{23}/n+V_{21}$ the error terms (one is positive and the other is negative) cancel one another leaving only the temperature signal.

A more detailed implementation of the FIG. 8 embodiment, configured to vary the gain so that the error terms can be scaled and subsequently cancelled, is shown on FIG. 9 wherein the gain is not changed by changing the capacitance ratio in the feedback of an operational amplifier. As shown, all three excitation currents $I_1$, $I_2$ and $I_3$ are used as shown at 40, 42. The temperature sensor comprising the diode 34 and resistance 38 is connected to the input of the variable gain preprocessor 110. The input of preprocessor 110 includes coupling capacitor 136 connected to the inverting input of operational amplifier 138. In this embodiment, only two programmable feedback paths are provided. One includes the capacitor 140 and switch 142, and the other includes switch 144 only. The output of the preprocesser 110 is Vout_pre, and is applied to the input of the voltage to temperature converter 112 shown as a delta $V_{BE}$ integrator. The converter 112 includes at its input, coupling capacitor 146, connected to the inverting input of the operational amplifier 150. Amplifier 150 is also provided with two programmable feedback paths, one including the capacitor 152 and switch 154, and the other including the switch 156 only.

Figure 9:
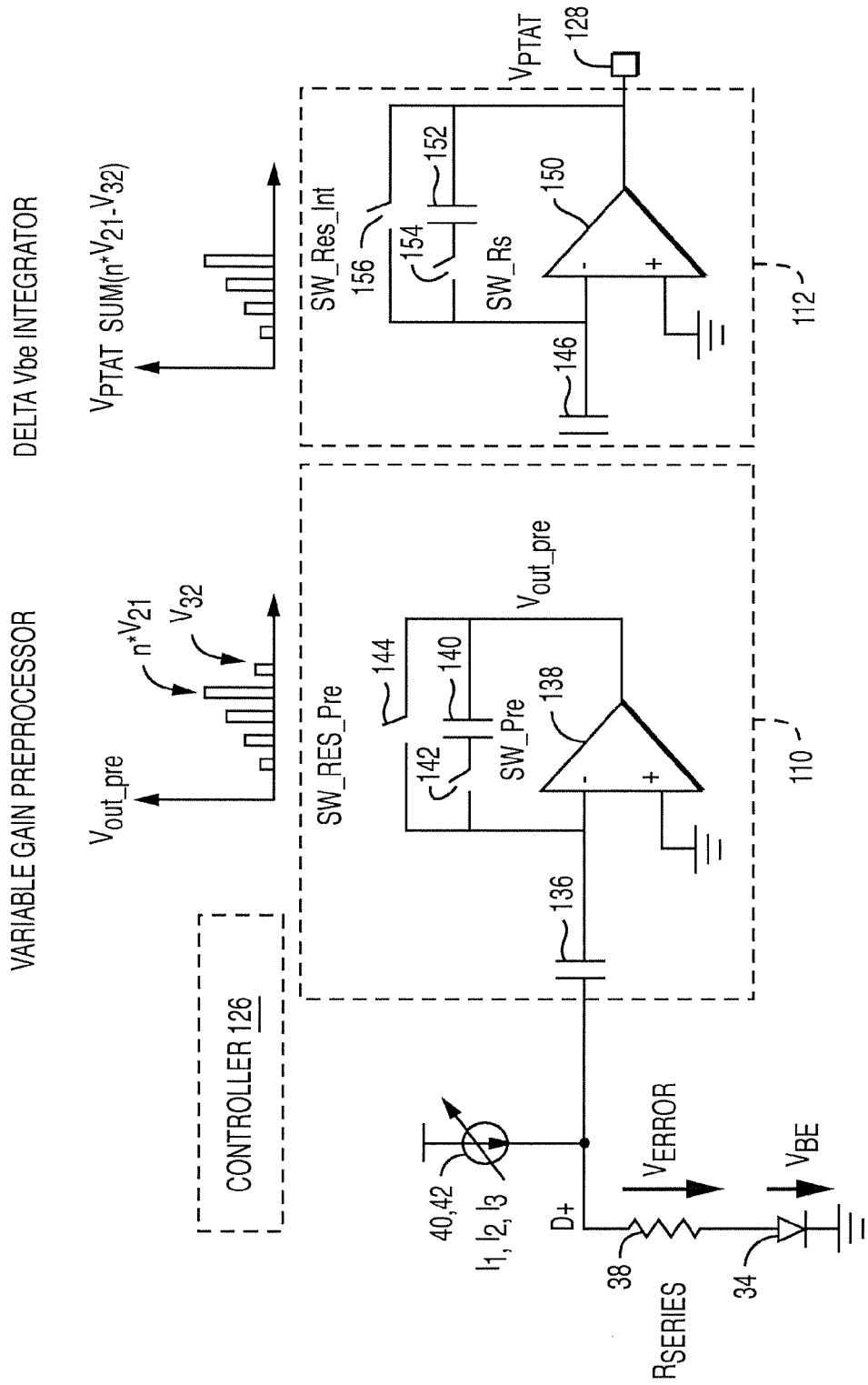
FIG. 9 is a partial block and partial schematic diagram showing details of the variable gain buffer embodiment shown in FIG. 8.

The variable gain preprocessor stage of FIG. 9 takes advantage of the integrating behavior by integrating several $V_{BE}$s. As shown if you integrate n times, then you have n·$V_{21^-}$. This can then be added to the value of $-V_{32^-}$. The result is the same because instead of dividing $-V_{32^-}$ by "n" and adding it to $V_{21}$, you are multiplying $V_{21^-}$ by "n" and adding it to $-V_{32^-}$. In this embodiment, the difference between the value of n·$V_{21^-}$ and $V_{32}$ is accomplished in the delta $V_{BE}$ integrator.

Figure 10:
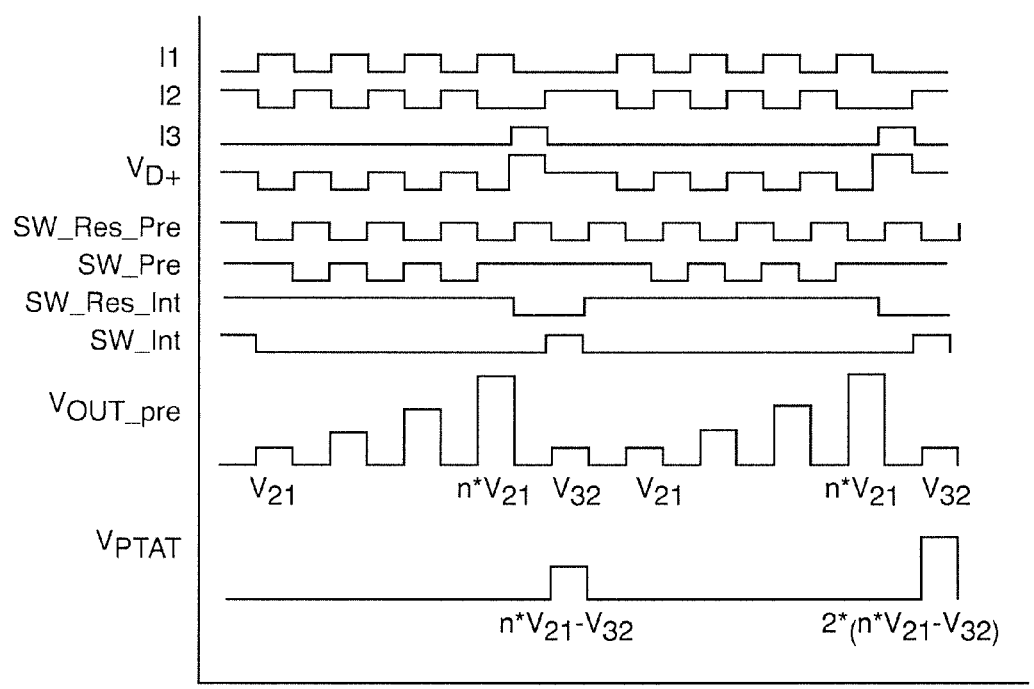
FIG. 10 is an example of a timing diagram representing the operation of the FIG. 8 exemplary embodiment during the extraction phase of operations.

Referring to the timing diagram of FIG. 10, looking at the signal Vout_pre that appears at the output of the first stage 110, at the intervals shown, $V_{21}$ is added n times to provide n·$V_{21}$. When the sample n·$V_{21}$ is accumulated on the capacitor 140 of the first stage, the current $I_3$ is used, switch 142 is left closed, the switch 156 is opened, and the switch 154 of the delta $V_{BE}$ integrator 112 is closed. This has the effect of transferring the difference of n·$V_{21}-V_{32}$ to the input of the delta $V_{BE}$ integrator 112 and storing it on the feedback capacitor 152. This is possible because the first integrating stage 110 includes two switches 142 and 144 and one capacitor 140 in the feed back paths of operational amplifier 138. By opening and closing the switches in a predetermined sequence it is possible to sum up the differences. It should be noted that if closing all switches 142, 144, 154 and 156 resets capacitors 140 and 152. This results in the inverting input of each operational amplifier 138 and 150 to be driven to ground potential. If the output Vout_pre changes, only the delta is transferred to the input of operational amplifier 150 for that period in which the voltage is changing because of the nature of the coupling capacitor. When switch 154 is closed, feedback capacitor 152 of integrator 112 is charged. Note that when switch 156 is closed, nothing is happening in the output stage because the inverting input is driven to system ground. When switch 156 is opened, and switch 154 closed, only the capacitor 152 is connected in the feedback path of output amplifier 150 so that the output signal $V_{PTAT}$ will appear at the output. The signals can be processed repeatedly so as to improve the S/N ratio of the output signal.

The components, steps, features, benefits and advantages that have been discussed are merely illustrative. None of them, nor the discussions relating to them, are intended to limit the scope of protection in any way. Numerous other embodiments are also contemplated. Additionally, embodiments of the present disclosure can have fewer, additional, and/or different components, steps, features, benefits and advantages than as expressly described herein. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" if and when used in a claim is intended to and should be interpreted to embrace the corresponding structures and materials that have been described and their equivalents. Similarly, the phrase "step for" if and when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. An analog system for providing at a system output an analog output signal proportional to the absolute temperature of a semiconductor junction, the system comprising:

an analog preprocessing stage comprising a variable offset buffer and resistance extraction circuit; wherein the variable offset buffer is configured and arranged so as to process an analog signal from the semiconductor junction so as to produce an analog preprocessed signal including a resistance error term stored in the resistance extraction circuit; and an analog temperature to voltage converter stage for converting the analog preprocessed signal to an analog voltage proportional to absolute temperature representing the absolute temperature of the semiconductor junction;

wherein the system is configured and arranged so as to extract the resistance error term as a function of three analog excitation currents of different values $I_1$, $I_2$ and $I_3$ applied in a measurement cycle sequentially through the semiconductor junction, and produce at least one instantly resistance error free analog signal representative of the semiconductor junction temperature as a function of two of the excitation currents $I_1$ and $I_2$ and independent of excitation current $I_3$.

2. A system according to claim 1, wherein the preprocessing stage includes an analog resistance error extraction circuit configured and arranged so as to generate an analog resistance error term signal representative of the resistance error term during an extraction phase, and an analog cancellation circuit for cancelling the resistance error term from the sensor signal so as to produce at least one instant value of the resistance error free analog signal using only two of the three excitation currents during a cancellation phase.

3. A system according to claim 2, further including
an analog variable offset buffer configured and arranged so as to generate a buffered analog signal from the semiconductor junction with a variable offset; and
an analog signal integration circuit arrangement coupled to the output of the variable offset buffer and configured so as to as to generate an integrated signal as a function of integrated differential measurements of the buffered signal and providing a measured temperature analog output signal with each measurement cycle;
wherein the variable offset is a function of the measurement current cycle and the resistive error term so that the integrated signal represents the resistive error compensated temperature of the semiconductor junction.

4. A system according to claim 1, further including three current sources for sequentially applying three excitation currents of different values $I_1$, $I_2$ and $I_3$, through the semiconductor junction so as to develop successive measured sensor signals in response to each of the excitation currents.

5. A system according to claim 4, wherein the successive measured signals generated in response to each of the excitation currents $I_1$, $I_2$ and $I_3$ are measured voltages $V_1$, $V_2$ and $V_3$, respectively, such that the resistance error term is equal to $$Rs \cdot (I_3 - 2I_2 + I_1)$$

6. A system according to claim 5, wherein the resistance error term is determined in accordance with the following:

$$V_3 + V_1 - 2V_2 = \frac{\eta kT}{q} \cdot [\ln(I_3/I_2) - \ln(I_2/I_1)] + Rs \cdot (I_3 - 2I_2 + I_1)$$

wherein $I_3/I_2 = I_2/I_1$ so as to extract the resistance error term; and
wherein
$\eta$ is the semiconductor ideality factor;
k is the Boltzmann constant;
T is the absolute temperature; and
q is the electron charge.

7. A system according to claim 6, further including a storage device connected to accumulate and store the values of $V_3 + V_1 - 2V_2$.

8. A system according to claim 7, wherein the storage device is a capacitor.

9. An analog system for providing an analog output signal at a system output proportional to the absolute temperature of a semiconductor junction, comprising:
an analog preprocessing stage configured and arranged so as to process an analog signal from the semiconductor junction so as to produce an analog preprocessed signal including a resistance error term; and
an analog temperature to voltage converter stage for converting the analog preprocessed signal to a voltage proportional to absolute temperature representing the absolute temperature of the semiconductor junction;
wherein the system is configured and arranged so as to remove the resistance error term so as to produce at least one instantly resistance error free analog signal representative of the semiconductor junction temperature as a function of three analog excitation currents of different values $I_1$, $I_2$ and $I_3$ applied in a measurement cycle sequentially through the semiconductor junction, and
wherein the preprocessing stage includes a variable gain amplifier for scaling signals comprising a plurality of capacitors from the semiconductor junction as a function of the corresponding excitation current applied to the semiconductor junction so that the resistance error terms of the corresponding preprocessed signals are the same regardless of the magnitude of the excitation current.

10. A system according to claim 9, wherein measured signals generated in response to each of the excitation currents $I_1$, $I_2$ and $I_3$ are measured voltages $V_1$, $V_2$ and $V_3$, respectively, such that the preprocessed signal generated after application of excitation currents $I_1$ and $I_2$ is given as:

$$V\text{out} = V_{21}$$

and after application of excitation currents I2 and I3 is given as:

$$V\text{out} = (V_{23}/n)$$

wherein
$V_{23} = V_2 - V_3$;
$V_{21} = V_2 - V_1$;
$V_1$, $V_2$ and $V_3$ are the measured signals generated in response to the application of the corresponding excitation currents $I_1$, $I_2$ and $I_3$ to the semiconductor junction;
$n = I_2/I_1 = I_3/I_2$; and
$1/n$ is the gain applied to measured signal.

11. A system according to claim 10, wherein the output of the temperature to voltage converter is given by:

$$V_{PTAT} = [(n-1)/n] \cdot (\eta kT/q) \ln(n)$$

wherein
$\eta$ is the semiconductor ideality factor;
k is the Boltzmann constant;
T is the absolute temperature; and
q is the electron charge.

12. A system according to claim 11, wherein the preprocessing stage includes a signal storage device for accumulating signals so as to provide the signals $V_{23}/n$ and $V_{21}$.

13. A system according to claim 12, wherein the storage device is a capacitor.

14. A system according to claim 10, wherein the temperature to voltage converter includes a signal storage device configured to accumulate the outputs of the variable gain amplifier so as to provide the signals $V_{23}/n$ and $V_{21}$.

15. A system according to claim 14, wherein the storage device is a capacitor.

16. A method according to claim 9, wherein preprocessing includes scaling signals from the semiconductor junction as a function of the corresponding excitation current applied to the semiconductor junction so that the resistance error terms of the corresponding preprocessed signals are the same regardless of the magnitude of the excitation current.

17. A method according to claim 16, wherein measured signals generated in response to each of the excitation currents $I_1$, $I_2$ and $I_3$ are measured voltages $V_1$, $V_2$ and $V_3$, respectively, such that the preprocessed signal generated after application of excitation currents $I_1$ and $I_2$ is given as:

$$V\text{out} = V_{21}$$

and after application of excitation currents I2 and I3 is given as:

$$V_{out}=(V_{23}/n)$$

wherein
$V_{23}=V_2-V_3$;
$V_{21}=V_2-V_1$;
$V_1$, $V_2$ and $V_3$ are the measured signals generated in response to the application of the corresponding excitation currents $I_1$, $I_2$ and $I_3$ to the semiconductor junction;
$n=I_2/I_1=I_3/I_2$; and
1/n is the gain applied to measured signal.

18. A method according to claim 17, preprocessing includes accumulating the outputs of the variable gain amplifier so as to provide the signals $V_{23}/n$ and $V_{21}$.

19. A method according to claim 18, wherein accumulating occurs on a capacitor.

20. A method according to claim 17, further including: accumulating the outputs of the variable gain amplifier so as to provide the signals $V_{23}/n$ and $V_{21}$.

21. A method according to claim 20, wherein accumulating is accomplished on a capacitor.

22. A method of providing at a system output an analog output signal proportional to the absolute temperature of a semiconductor junction, the method comprising:
preprocessing an analog signal from the semiconductor junction using a variable offset buffer so as to produce an analog preprocessed signal including a resistance error term;
generating a signal representing the resistance error term as a function of three analog excitation currents of different values $I_1$, $I_2$ and $I_3$ applied in a measurement cycle sequentially through the semiconductor junction, so that the resistance error term can be extracted from the analog preprocessed signal; and
converting the analog preprocessed signal to an analog voltage proportional to absolute temperature representing the absolute temperature of the semiconductor junction as a function of the excitation currents $I_1$ and $I_2$ and independent of excitation current $I_3$;
wherein the analog voltage proportional to absolute temperature is free of the resistance error term so as to produce at least one instantly resistance error free analog signal representative of the semiconductor junction temperature.

23. A method according to claim 22, wherein preprocessing a signal from the semiconductor junction includes generating a resistance error term signal representative of the resistance error term, extracting the resistance error term from the preprocessed signal so as to produce the at least one instantly resistance error free analog signal.

24. A method according to claim 23, further including:
generating a buffered signal from the semiconductor junction with a variable offset; and
generating an integrated signal as a function of integrated differential measurements of the buffered signal;
wherein the variable offset is a function of the measurement current cycle and the resistive error term so that the integrated signal represents the resistive error compensated temperature of the semiconductor junction.

25. A system according to claim 22, further including sequentially applying three excitation currents of different values $I_1$, $I_2$ and $I_3$, through the semiconductor junction so as to develop successive measured sensor signals in response to each of the excitation currents.

26. A method according to claim 25, wherein the successive measured signals generated in response to each of the excitation currents $I_1$, $I_2$ and $I_3$ are measured voltages $V_1$, $V_2$ and $V_3$, respectively, such that the resistance error term is equal to $$Rs \cdot (I_3 - 2I_2 + I_1)$$

27. A method according to claim 26, wherein the resistance error term is determined in accordance with the following:

$$V_3 + V_1 - 2V_2 = \frac{\eta kT}{q} \cdot [\ln(I_3/I_2) - \ln(I_2/I_1)] + Rs \cdot (I_3 - 2I_2 + I_1)$$

wherein $I_3/I_2=I_2/I_1$ so as to extract the resistance error term; and
wherein
$\eta$ is the semiconductor ideality factor;
k is the Boltzmann constant;
T is the absolute temperature; and
q is the electron charge.

28. A method according to claim 27, further including accumulating and storing the values of $V_3+V_1-2V_2$.

29. A method according to claim 28, wherein accumulating and storing the values of $V_3+V_1-2V_2$ is accomplished on a capacitor.

30. A method according to claim 27, wherein the voltage proportional to absolute temperature is given by:

$$V_{PTAT}=[(n-1)/n] \cdot (\eta kT/q)\ln(n)$$

wherein
$\eta$ is the semiconductor ideality factor;
k is the Boltzmann constant;
T is the absolute temperature; and
q is the electron charge.

* * * * *